United States Patent
Matsuda

(10) Patent No.: US 12,407,673 B2
(45) Date of Patent: Sep. 2, 2025

(54) DIGITAL CERTIFICATE MANAGEMENT

(71) Applicant: TOSHIBA TEC KABUSHIKI KAISHA, Tokyo (JP)

(72) Inventor: Okiharu Matsuda, Susono Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 291 days.

(21) Appl. No.: 18/190,169

(22) Filed: Mar. 27, 2023

(65) Prior Publication Data
US 2024/0333707 A1    Oct. 3, 2024

(51) Int. Cl.
*H04L 9/40* (2022.01)
*H04L 61/4511* (2022.01)
*H04L 67/02* (2022.01)

(52) U.S. Cl.
CPC ...... *H04L 63/0823* (2013.01); *H04L 61/4511* (2022.05); *H04L 67/02* (2013.01)

(58) Field of Classification Search
CPC ... H06L 63/0823; H04L 61/4511; H04L 67/02
See application file for complete search history.

(56) References Cited

U.S. PATENT DOCUMENTS

| | | | |
|---|---|---|---|
| 2009/0172117 A1* | 7/2009 | Bedi | H04W 52/0216 709/206 |
| 2017/0373860 A1* | 12/2017 | Kshirsagar | H04L 67/02 |
| 2021/0160325 A1* | 5/2021 | Lee | H04L 63/0823 |

FOREIGN PATENT DOCUMENTS

| | | |
|---|---|---|
| JP | 1999-252201 | 9/1999 |
| JP | 2020-72304 | 5/2020 |
| JP | 2022-136793 | 9/2022 |

* cited by examiner

*Primary Examiner* — Viet D Vu
(74) *Attorney, Agent, or Firm* — Amin, Turocy & Watson, LLP

(57) ABSTRACT

According to one embodiment, a mobile communication apparatus includes a communication module and a main module. The communication module is capable of storing only one of an MQTTS certificate and an HTTPS certificate. The main module is capable of storing both the MQTTS certificate and the HTTPS certificate. The main module provides the MQTTS certificate to the communication module if the communication module starts MOTTS communication. The main module provides the HTTPS certificate to the communication module if the communication module starts HTTPS communication in a case where the communication module performs the HTTPS communication during a keep-alive interval of the MQTTS communication and provides the MQTTS certificate to the communication module if the communication module stops the HTTPS communication.

9 Claims, 2 Drawing Sheets

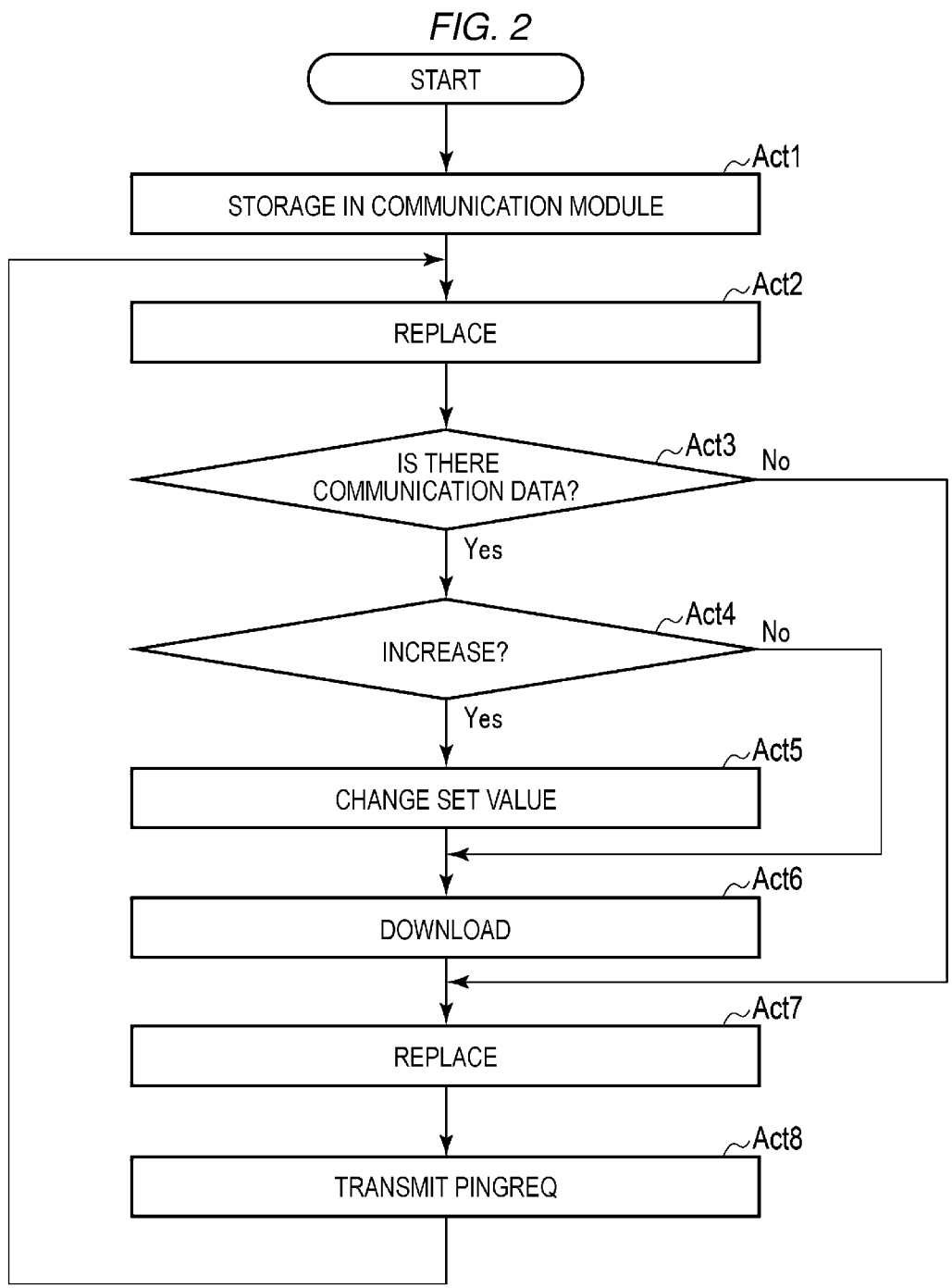

DIGITAL CERTIFICATE MANAGEMENT

FIELD

Embodiments described herein relate generally to a mobile communication apparatus, a network system, and a communication method.

BACKGROUND

In the related art, in case of using certificates for various protocols, there is a certificate for each protocol. For example, in the case of a system that manages devices as mobile device management, the device is managed with MOTTS, and HTTPS is used for file communication. A certificate is generally used for each for ensuring security. However, some communication apparatuses have only one certificate storage area. Since such communication apparatuses use the same certificate for a plurality of protocols, the security level is lowered.

DESCRIPTION OF THE DRAWINGS

FIG. 2 is a flowchart illustrating an operation of the network system illustrated in FIG. 1.

DETAILED DESCRIPTION

Figure 1:
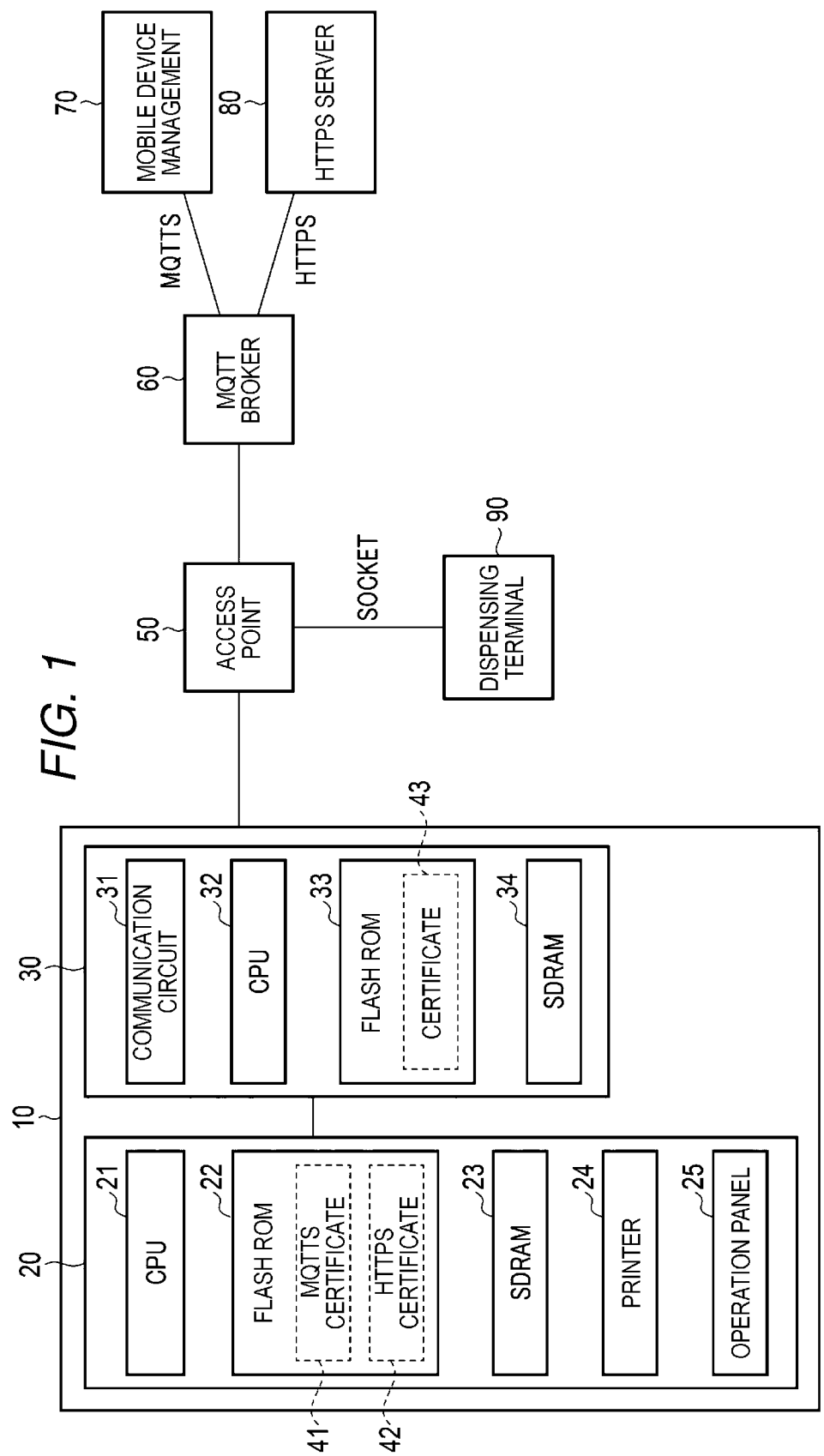
FIG. 1 is a diagram illustrating a configuration of a network system including a mobile communication apparatus according to an embodiment.

In general, according to one embodiment, a mobile communication apparatus includes a communication module and a main module. The communication module is capable of storing only one of an MOTTS certificate and an HTTPS certificate. The main module is capable of storing both the MOTTS certificate and the HTTPS certificate. The main module provides the MQTTS certificate to the communication module if communication the module starts MOTTS communication, and the communication module uses the received MQTTS certificate to start the MQTTS communication. The main module provides the HTTPS certificate to the communication module if the communication module starts HTTPS communication in a case where the communication module performs the HTTPS communication during a keep-alive interval of the MQTTS communication, the communication module uses the received HTTPS certificate to start the HTTPS communication, the main module provides the MQTTS certificate to the communication module if the communication module stops the HTTPS communication, and the communication module uses the received MQTTS certificate to transmit a PINGREQ command and to continue the MOTTS communication.

Hereinafter, the embodiment is described below with reference to FIG. 1. FIG. 1 is a diagram illustrating a configuration of a network system including the mobile communication apparatus according to the embodiment. In the embodiment, the mobile communication apparatus is a mobile printer 10.

Network System

The network system includes the mobile printer 10, an access point 50, an MQTT broker 60, mobile device management 70, an HTTPS server 80, and a dispensing terminal 90.

The access point 50 is a connection destination for wireless communication by the mobile printer 10.

The MQTT broker 60 wirelessly communicates with the mobile printer 10 via the access point 50, establishes the MQTTS communication with the mobile device management 70, and is a relay server for establishing the HTTPS communication with the HTTPS server 80.

The mobile device management 70 manages the mobile printer 10 via the MQTT broker 60 and the access point 50 by the MQTTS communication. For example, the mobile device management 70 manages parameters, voltages, and states (idle or active) of the mobile printer 10 and the like.

The HTTPS server 80 stores communication data required by the mobile printer 10, for example, update data for the firmware of the mobile printer 10. The communication data is downloaded to the mobile printer 10 via the MQTT broker 60 and the access point 50 by the HTTPS communication.

The dispensing terminal 90 is a terminal that generates print data of the mobile printer 10 and transmits the print data, a print command, and the like. The transmission data of the dispensing terminal 90 is transmitted to the mobile printer 10 via the access point 50 by SOCKET communication.

Mobile Printer

The mobile printer 10 includes a main module 20 and a communication module 30. The main module 20 and the communication module 30 can communicate with each other.

The main module 20 includes a CPU 21, a flash ROM 22, an SDRAM 23, a printer 24, and an operation panel 25.

The CPU 21 is a processor and controls the flash ROM 22, the SDRAM 23, the printer 24, and the operation panel 25.

The flash ROM 22 is a non-volatile memory that non-temporarily stores an MOTTS certificate 41 and an HTTPS certificate 42 both. The flash ROM 22 also stores firmware, a control program, and the like.

The SDRAM 23 is a volatile memory that temporarily stores the firmware, the control program, and the like executed by the CPU 21.

The printer 24 is a device that prints the print data received from the dispensing terminal 90 under the control of the CPU 21 if the mobile printer 10 receives the print command from the dispensing terminal 90. For example, the printer 24 is a thermal printer.

The operation panel 25 is a device that receives a command from a user and displays information to a user for promotion.

The CPU 21 reads the firmware stored in the flash ROM 22 to the SDRAM 23 and executes the firmware for controlling the entire main module 20.

The communication module 30 includes a communication circuit 31, a CPU 32, a flash ROM 33, and an SDRAM 34.

The communication circuit 31 is a circuit for communication with the outside. Specifically, the communication circuit 31 performs the SOCKET communication with the dispensing terminal 90 via the access point 50. In addition, the communication circuit 31 performs the MQTTS communication with the mobile device management 70 and performs the HTTPS communication with the HTTPS server 80, via the access point 50 and the MQTT broker 60.

The CPU 32 is a processor and controls the communication circuit 31, the flash ROM 33, and the SDRAM 34.

The flash ROM 33 is a non-volatile memory that can non-temporarily store only one certificate 43 in order to reduce the size of the communication module 30. The certificate 43 is any one of the MQTTS certificate 41 and the HTTPS certificate 42. The flash ROM 33 also stores firmware.

The SDRAM 34 is a volatile memory that temporarily stores the firmware executed by the CPU 32.

The CPU 32 reads the firmware stored in the flash ROM 33 to the SDRAM 34 and executes the firmware for controlling the entire communication module 30.

Operation

Hereinafter, with reference to FIG. 2, an operation of the network system illustrated in FIG. 1 is described. FIG. 2 is a flowchart illustrating the operation of the network system illustrated in FIG. 1. In the following description, an operation of the mobile printer 10 is performed by the main module 20. Specifically, the CPU 21 of the main module 20 reads the control program stored in the flash ROM 22 to the SDRAM 23 and executes the control program to perform the operation of the mobile printer 10.

In Act 1, at the start of the mobile printer 10, the main module 20 provides the MOTTS certificate 41 to the communication module 30. The communication module 30 stores the received MOTTS certificate 41 in the flash ROM 33. The communication module 30 uses the MOTTS certificate 41 to transmit a CONNECT command and to be connected to the MQTT broker 60 via the access point 50. Similarly, the MQTT broker 60 establishes the MOTTS communication with the mobile device management 70. As a result, the communication module 30 starts the MOTTS communication with the mobile device management 70 via the access point 50 and the MQTT broker 60. After the start of the MOTTS communication, the mobile device management 70 manages the mobile printer 10 by the MOTTS communication via the MQTT broker 60 and the access point 50.

The MQTT broker 60 cuts the connection to the mobile printer 10 if there is no communication from the mobile printer 10 for 1.5 times a predetermined time interval. In order to continue the connection to the MQTT broker 60, the communication module 30 periodically transmits the PINGREQ command at a predetermined time interval. The periodical transmission of the PINGREQ command is referred to as keep-alive. Hereinafter, the predetermined time interval is referred to as the keep-alive interval, for convenience. A set value of the keep-alive interval is included in the CONNECT command as a parameter. For example, the set value of the keep-alive interval is 60 seconds.

In Act 2, during the keep-alive interval of the MOTTS communication, the main module 20 provides the HTTPS certificate 42 to the communication module 30. The communication module 30 stores the received HTTPS certificate 42 in the flash ROM 33. That is, the communication module 30 replaces the MQTTS certificate 41 in the flash ROM 33 with the HTTPS certificate 42. Thereafter, the communication module 30 uses the HTTPS certificate 42 to be connected to the MQTT broker 60 via the access point 50. Accordingly, the MQTT broker 60 establishes the HTTPS communication with the HTTPS server 80. That is, the communication module 30 starts the HTTPS communication with the HTTPS server 80 via the access point 50 and the MQTT broker 60.

In Act 3, the main module 20 confirms whether there is communication data, such as update data for the firmware in the HTTPS server 80 via the communication module 30, the access point 50, and the MQTT broker 60.

As a result of the confirmation in Act 3, if there is the communication data in the HTTPS server 80, the main module 20 determines whether to increase the keep-alive interval in Act 4. If a data amount of the communication data is large, for example, if it is expected that the download does not stop during the current keep-alive interval or several subsequent keep-alive intervals, the main module 20 determines that it is necessary to increase the keep-alive interval.

If it is determined that the keep-alive interval needs to be increased, in Act 4, the main module 20 changes the set value of the keep-alive interval to increase the set value, in Act 5.

In Act 6, the main module 20 downloads the communication data from the HTTPS server 80 via the communication module 30, the access point 50, and the MQTT broker 60.

In Act 7, the communication module 30 stops the HTTPS communication during the keep-alive interval. Subsequently, the main module 20 provides the MQTTS certificate 41 to the communication module 30. The communication module 30 stores the received MOTTS certificate 41 in the flash ROM 33. That is, the communication module 30 replaces the HTTPS certificate 42 in the flash ROM 33 with the MQTTS certificate 41.

Subsequently, in Act 8, for example, at the end of the keep-alive interval, the communication module 30 uses the MQTTS certificate 41 to transmit the PINGREQ command and to continue the connection to the MQTT broker 60 via the access point 50. The PINGREQ command includes the set value after the change of the keep-alive interval, that is, after the increase thereof, as a parameter.

If it is determined that the keep-alive interval does not need to be increased, in Act 4, the main module 20 skips the process of Act 5 and proceeds to the downloading process of Act 6.

The processes of Acts 4 and 5 are not necessarily required and may be skipped.

As a result of the confirmation in Act 3, if there is no communication data in the HTTPS server 80, the main module 20 skips the processes of Acts 4 to 6 and proceeds to the certificate replacement process of Act 7.

Thereafter, the mobile printer 10 (the main module 20 and the communication module 30) repeats the processes of Acts 2 to 8 until the downloading of the communication data is completed. That is, the mobile printer 10 continues the MQTTS communication by replacing the MOTTS certificate 41 and the HTTPS certificate 42 with each other during the keep-alive interval of the MQTTS communication and downloads the communication data by the HTTPS communication.

After the downloading of the communication data is completed, the mobile printer 10 may skip the processes of Acts 2 to 7 and may return the set value of the keep-alive interval to an initial value.

The mobile device management 70 continues the management of the mobile printer 10 until the MQTTS communication is interrupted by shutdown of the mobile printer 10 or the like.

Effect

In the mobile printer 10 according to the embodiment, the communication module 30 can store only one certificate 43 but can perform the MQTTS communication and the HTTPS communication without lowering the security level by providing one of the MQTTS certificate 41 and the HTTPS certificate 42 appropriate for the required communication to the communication module 30 by the main module 20.

In addition, the number of times of starting and stopping the HTTPS communication is reduced by increasing the keep-alive interval of the MQTTS communication, so that the reduction of the entire time required for downloading the communication data can be attempted.

While certain embodiments have been described, these embodiments have been presented by way of example only, and are not intended to limit the scope of the inventions. Indeed, the novel apparatus, system and method described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A mobile communication apparatus, comprising:
a communication module configured to store only one of an MQTTS certificate and an HTTPS certificate, use the MQTTS certificate to perform MQTTS communication, and use the HTTPS certificate to perform HTTPS communication; and
a main module configured to store both the MQTTS certificate and the HTTPS certificate, provide the MQTTS certificate to the communication module if the communication module starts the MQTTS communication, to enable the communication module to start the MQTTS communication, provide the HTTPS certificate to the communication module if the communication module starts the HTTPS communication in a case where the communication module performs the HTTPS communication during a keep-alive interval of the MQTTS communication, to enable the communication module to start the HTTPS communication, and provide the MQTTS certificate to the communication module if the communication module stops the HTTPS communication, to enable the communication module to transmit a PINGREQ command and continue the MQTTS communication,
wherein the communication module repeats the HTTPS communication throughout a plurality of the keep-alive intervals if a communication amount of the HTTPS communication is large,
wherein the communication module increases a set value of the keep-alive interval and increases a period of the HTTPS communication,
wherein the main module changes the set value of the keep-alive interval to increase the set value, and
wherein the main module returns the set value of the keep-alive interval to an initial value in response to a download of communication data being determined to be complete.

2. The mobile communication apparatus according to claim 1,
wherein the main module stores both the MQTTS certificate and the HTTPS certificate in a flash memory.

3. The mobile communication apparatus according to claim 1,
wherein the mobile communication apparatus is a mobile printer.

4. A network system, comprising:
a mobile communication apparatus that includes
a communication module configured to store only one of an MQTTS certificate and an HTTPS certificate, use the MQTTS certificate to perform MQTTS communication, and use the HTTPS certificate to perform HTTPS communication, and
a main module configured to store both the MQTTS certificate and the HTTPS certificate, provide the MQTTS certificate to the communication module if the communication module starts the MQTTS communication, to enable the communication module to start the MQTTS communication, provide the HTTPS certificate to the communication module if the communication module starts the HTTPS communication in a case where the communication module performs the HTTPS communication during a keep-alive interval of the MQTTS communication, to enable the communication module to start the HTTPS communication, and provide the MQTTS certificate to the communication module if the communication module stops the HTTPS communication, to enable the communication module to transmit a PINGREQ command and continue the MQTTS communication;
an access point comprising a connection destination for wireless communication by the mobile communication apparatus;
an MQTT broker that wirelessly communicates with the mobile communication apparatus via the access point;
mobile device management that manages the mobile communication apparatus via the MQTT broker and the access point by the MQTTS communication; and
an HTTPS server that stores communication data to be downloaded to the mobile communication apparatus via the MQTT broker and the access point by the HTTPS communication,
wherein the communication module repeats the HTTPS communication throughout a plurality of the keep-alive intervals if a communication amount of the HTTPS communication is large,
wherein the communication module increases a set value of the keep-alive interval and increases a period of the HTTPS communication,
wherein the main module changes the set value of the keep-alive interval to increase the set value, and
wherein the main module returns the set value of the keep-alive interval to an initial value in response to a download of communication data being determined to be complete.

5. The network system according to claim 4,
wherein the main module stores both the MQTTS certificate and the HTTPS certificate in a flash memory.

6. The network system according to claim 4,
wherein the mobile communication apparatus is a mobile printer.

7. A communication method for causing a mobile communication apparatus that includes a communication module configured to store only one of an MQTTS certificate and an HTTPS certificate and a main module configured to store both the MQTTS certificate and HTTPS certificate to perform:
providing the MQTTS certificate from the main module to the communication module if MQTTS communication is started, to enable the communication module to start the MQTTS communication;
providing the HTTPS certificate from the main module to the communication module if HTTPS communication is started in a case where the HTTPS communication is performed during a keep-alive interval of the MQTTS communication, to enable the communication module to start the HTTPS communication;
providing the MQTTS certificate from the main module to the communication module if the HTTPS communication is stopped, to enable the communication module to transmit a PINGREQ command and continue the MQTTS communication;

repeating the HTTPS communication throughout a plurality of the keep-alive intervals if a communication amount of the HTTPS communication is large;

increasing a set value of the keep-alive interval and increasing a period of the HTTPS communication;

changing the set value of the keep-alive interval to increase the set value; and returning the set value of the keep-alive interval to an initial value in response to a download of communication data being determined to be complete.

8. The communication method according to claim 7, further comprising:

storing both the MQTTS certificate and the HTTPS certificate in a flash memory.

9. The communication method according to claim 7, wherein the mobile communication apparatus is a mobile printer.

\* \* \* \* \*